US012632766B1

(12) United States Patent
Schuetz et al.

(10) Patent No.: US 12,632,766 B1
(45) Date of Patent: May 19, 2026

(54) GRAPH-BASED COMPUTATIONAL POSITION ASSIGNMENTS FOR SOLVING OPTIMIZATION PROBLEMS ON QUANTUM COMPUTING DEVICES

(71) Applicant: Amazon Technologies, Inc., Seattle, WA (US)

(72) Inventors: Martin Schuetz, Brooklyn, NY (US); Grant Salton, San Jose, CA (US); Helmut Gottfried Katzgraber, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 861 days.

(21) Appl. No.: 18/054,509

(22) Filed: Nov. 10, 2022

(51) Int. Cl.
　　*G06N 10/60* 　　(2022.01)
　　*G06N 10/70* 　　(2022.01)
(52) U.S. Cl.
　　CPC ............. *G06N 10/60* (2022.01); *G06N 10/70* (2022.01)
(58) Field of Classification Search
　　CPC ............................... G06N 10/60; G06N 10/70
　　See application file for complete search history.

(56) References Cited

U.S. PATENT DOCUMENTS

|  |  |  |  |
|---|---|---|---|
| 10,509,065 B1 | 12/2019 | Shaffer | |
| 2020/0293838 A1* | 9/2020 | Li | G06F 18/217 |

| | | | | |
|---|---|---|---|---|
| 2021/0089954 A1* | 3/2021 | Kapit | | G06N 10/40 |
| 2021/0279631 A1* | 9/2021 | Pichler | | G06N 10/00 |
| 2022/0101167 A1* | 3/2022 | Pakhomchik | | G06N 10/00 |
| 2022/0238245 A1* | 7/2022 | Endres | | B82Y 10/00 |
| 2022/0269961 A1* | 8/2022 | Pramanik | | G06N 20/00 |
| 2022/0292382 A1* | 9/2022 | Heshami | | G06N 10/40 |
| 2024/0346352 A1* | 10/2024 | Bluvstein | | G06N 10/70 |
| 2024/0354369 A1* | 10/2024 | Bowles | | G06F 17/11 |
| 2025/0335808 A1* | 10/2025 | Ahn | | G06N 10/20 |

OTHER PUBLICATIONS

Paliwal et al., "Reinforcement Genetic Algorithm Learning for Optimizing computation graphs" 2020, pp. 1-24 [retrieved from https://arxiv.org/abs/1905.02494]. (Year: 2020).*
S. Ebadi, A. Keesling, M. Cain, T. T. Wang, H. Levine, D. Bluvstein, G. Semeghini, A. Omran, J. Liu, R. Samajdar, et al., "Quantum Optimization of Maximum Independent Set using Rydberg Atom Arrays" (2022), (arXiv:2202.09372), pp. 1-10.

(Continued)

*Primary Examiner* — Brian W Wathen
(74) *Attorney, Agent, or Firm* — S. Scott Foster; Kowert, Hood, Munyon, Rankin & Goetzel, P.C.

(57) ABSTRACT

Graph-based positional assignments may be made for solving optimization problems on quantum computing devices. An input graph that represents an optimization problem may be obtained. A physical graph of the input graph may be determined according to a random key technique that is applied to the input graph. The physical graph may assign nodes to different atomic computational positions in a quantum computing device. The optimization problem may be provided to the quantum computing device for execution using the assignments. The graph solution may then be obtained from the quantum computing device and decoded to determine one or more decision variables as a solution to the optimization problem.

20 Claims, 7 Drawing Sheets

(56)                    References Cited

OTHER PUBLICATIONS

H. Pichler, S.-T. Wang, L. Zhou, S. Choi, and M. D. Lukin, "Quantum Optimization for Maximum Independent Set Using Rydberg Atom Arrays" (2018), arXiv:1808.10816, pp. 1-13.

D. Bluvstein, H. Levine, G. Semeghini, T. T. Wang, S. Ebadi, M. Kalinowski, A. Keesling, N. Maskara, H. Pichler, M. Greiner, et al., "A quantum processor based on coherent transport of entangled atom arrays" (2021), (arXiv:2112.03923), pp. 1-23.

D. Conte, P. Foggia, C. Sansone, and M. Vento, "Thirty Years of Graph Matching in Pattern Recognition", International Journal of Pattern Recognition and Artificial Intelligence 18, pp. 265-298, (2004).

A. Kalra, F. Qureshi, and M. Tisi, "Portfolio Asset Identification Using Graph Algorithms on a Quantum Annealer", SSRN (2018), URL https://ssrn.com/abstract=3333537, pp. 1-18.

F. Glover, G. Kochenberger, and Y. Du, "Quantum Bridge Analytics I: A Tutorial on Formulating and Using QUBO Models", 4OR 17, pp. 335-371 (2019).

G. Kochenberger, J.-K. Hao, F. Glover, M. Lewis, Z. Lu, H. Wang, and Y. Wang, "The Unconstrained Binary Quadratic Programming Problem: A Survey", Journal of Combinatorial Optimization 28, pp. 1-33 (2014).

H. Markowitz, "Portfolio selection", The Journal of Finance, vol. 7, No. 1. (Mar., 1952), pp. 77-91.

V. Boginski, S. Butenko, and p. M. Pardalos, "Statistical analysis of financial networks", Computational Statistics and Data Analysis 48, pp. 431-443 (2005).

H. Yu, F. Wilczek, and B. Wu, "Quantum Algorithm for Approximating Maximum Independent Sets" (2020), (arXiv:2005.13089), pp. 1-12.

H. N. Djidjev, G. Chapuis, G. Hahn, and G. Rizk, "Efficient Combinatorial Optimization Using Quantum Annealing" (2018), (arXiv:1801.08653), pp. 1-25.

J. C. Bean, "Genetic algorithms and random keys for sequencing and optimization", ORSA Journal on Computing 6, pp. 154-160 (1994).

Mauricio G. C. Resende, ResearchGate, "Biased random-key genetic algorithms with applications in Telecommunications", Amazon Article in Top . Jan. 2010, DOI: 10.1007/s11750-011-0176-x, pp. 1-25.

* cited by examiner

Portfolio optimization pipeline

Random key optimizer (BRKGA, ...)

* Search combinatorial solution space indirectly
* Decoder maps chromosome to feasible solution Decoder

Problem setup 310

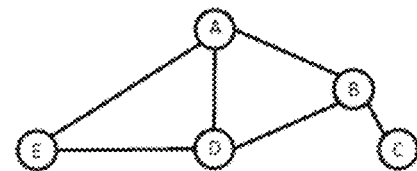

Input to end-to-end scheme:
- Input graph is generically not a unit-disk graph
- Input problem is generically not a MIS problem; example QUBO problem is $H(\vec{x}) = \vec{x}^T Q \vec{x}$.

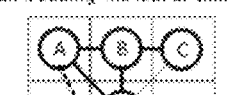

Embedding 320

Embedding without ancillas          Embedding with ancillas

- Physical graph $G$ is unit-disk graph
- Overhead is controllable and can be set by the user

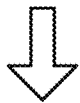

Quantum computation 330

Solution candidate:          Solution candidate:
$\vec{x} = (1,0,1,0,1)$          $\vec{z} = (1,0,1,0,0)$
                              Ancillas are discarded

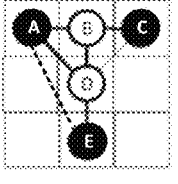
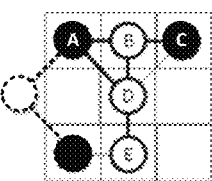

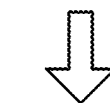

Evaluation 340

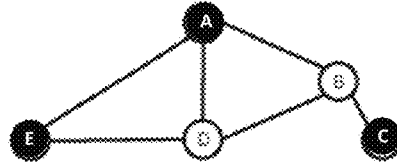

Evaluation of fitness signal:
- Fitness signal given by $f(\vec{x}) = H(\vec{x})$
- Feedback signal is fed back to RKO within end-to-end optimization loop

*FIG. 3*

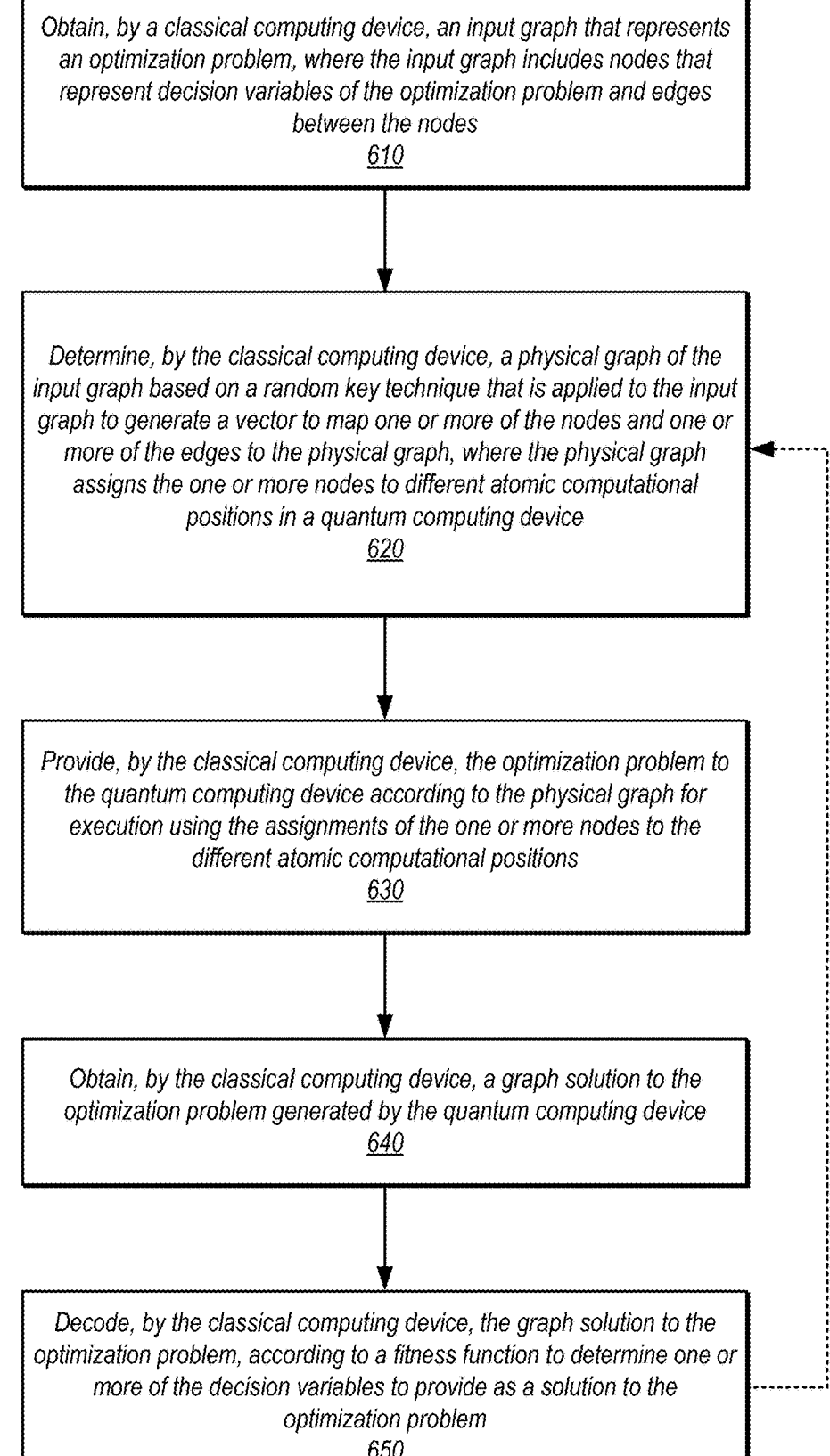

*Obtain, by a classical computing device, an input graph that represents an optimization problem, where the input graph includes nodes that represent decision variables of the optimization problem and edges between the nodes*
*610*

*Determine, by the classical computing device, a physical graph of the input graph based on a random key technique that is applied to the input graph to generate a vector to map one or more of the nodes and one or more of the edges to the physical graph, where the physical graph assigns the one or more nodes to different atomic computational positions in a quantum computing device*
*620*

*Provide, by the classical computing device, the optimization problem to the quantum computing device according to the physical graph for execution using the assignments of the one or more nodes to the different atomic computational positions*
*630*

*Obtain, by the classical computing device, a graph solution to the optimization problem generated by the quantum computing device*
*640*

*Decode, by the classical computing device, the graph solution to the optimization problem, according to a fitness function to determine one or more of the decision variables to provide as a solution to the optimization problem*
*650*

*FIG. 6*

GRAPH-BASED COMPUTATIONAL POSITION ASSIGNMENTS FOR SOLVING OPTIMIZATION PROBLEMS ON QUANTUM COMPUTING DEVICES

BACKGROUND

Optimization techniques offer solutions in many different technological areas. For example, combinatorial optimization is one area with many practical applications. Many different industries, in the private and public sectors, may use combinatorial optimization techniques to implement solutions in fields as diverse as transportation and logistics, telecommunications, and finance.

BRIEF DESCRIPTION OF THE DRAWINGS

FIG. 3 illustrates a logical block diagram illustrating graph-based positional assignments for solving optimization problems on quantum computing devices with ancillas and without ancillas, according to some embodiments.

FIG. 6 illustrates a high-level flowchart of various methods and techniques to implement graph-based positional assignments for solving optimization problems on quantum computing devices, according to some embodiments.

Figure 1:
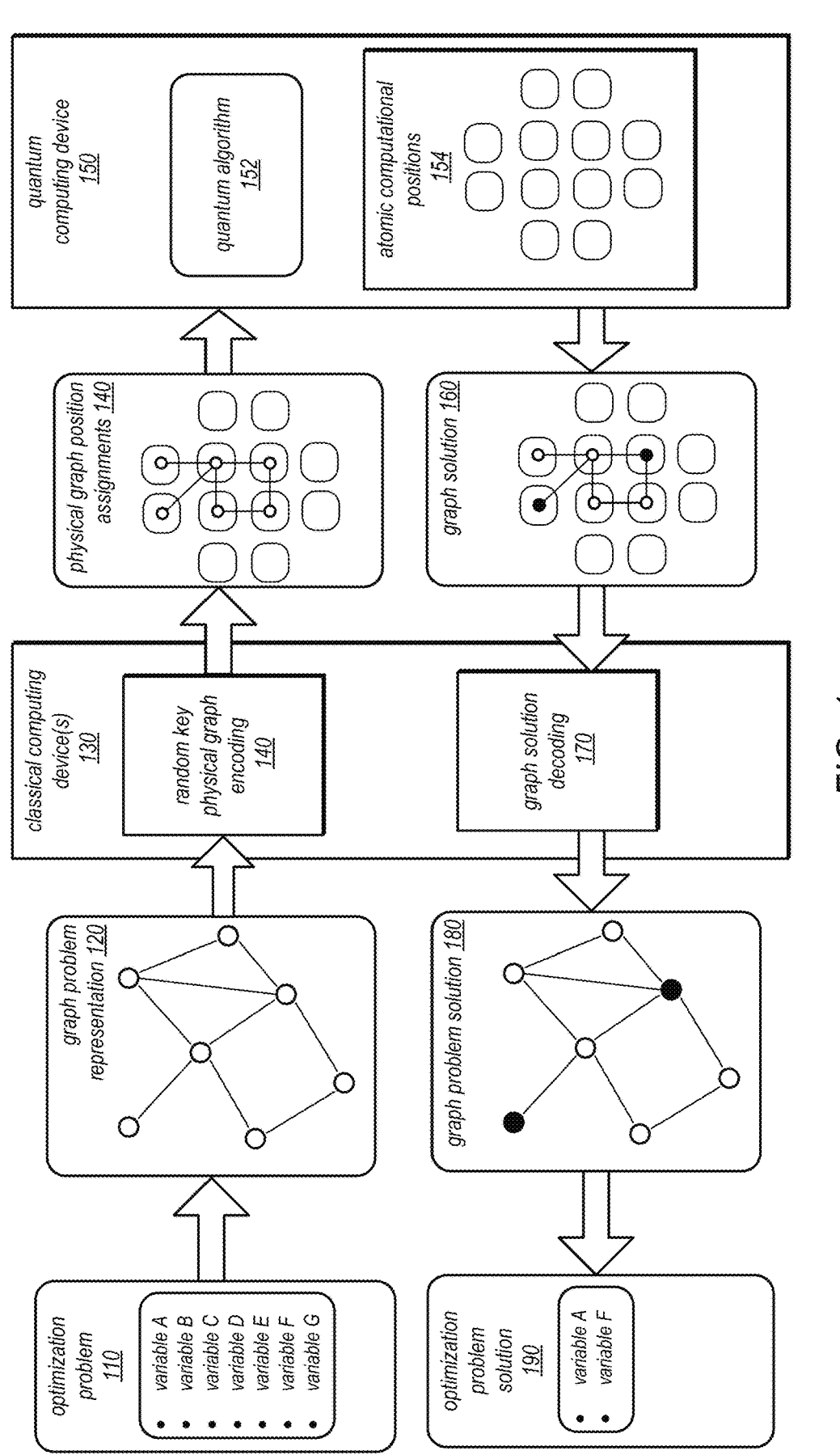
FIG. 1 illustrates a logical block diagram illustrating graph-based positional assignments for solving optimization problems on quantum computing devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms.

These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of graph-based positional assignments for solving optimization problems on quantum computing devices are described herein. Combinatorial optimization problems are pervasive across science and industry. Practical, yet notoriously challenging, applications can be found in virtually every industry, in areas such as transportation and logistics, telecommunications, manufacturing, and finance, among others. To date, the demonstration of a quantum speedup for a practically relevant, computationally hard problem (such as combinatorial optimization problems) remains an elusive milestone, and an open problem for quantum information scientists.

Over the last few years, programmable Rydberg atom arrays have emerged as a promising platform for the implementation of quantum optimization algorithms. Some of the exquisite, yet experimentally demonstrated capabilities of these devices include (i) deterministic positioning of individual neutral atoms in arrays with arbitrary arrangements, (ii) coherent manipulation of the internal states of these atoms (including excitation into Rydberg states), (iii) the ability to coherently shuttle around individual atoms, and (iv) strong interactions mediated by the Rydberg blockade mechanism.

The physics of the Rydberg blockade mechanism has been shown to be intimately related to optimization problems, such as the canonical (NP-hard) maximum independent set (MIS) problem. The MIS problem involves finding the largest independent set of vertices in a graph, e.g., the largest subset of vertices such that no edges connect any pair in the set. In various embodiments, graph-based encoding techniques for determining a physical layout for quantum hardware that solves optimization problems can be implemented such that optimization problems, like MIS problems, can be encoded with (e.g., effectively two-level) Rydberg atoms placed at the vertices of the target (problem) graph. The Rydberg interactions between atoms effectively prevents two neighboring atoms from being simultaneously in the excited Rydberg state, provided they are within the Rydberg blockade radius. This mechanism, while simple and strong, poses some limitations on the graph connectivity that can be natively realized with Rydberg atoms. Specifically, only so called unit-disk graphs—geometric graphs wherein vertices are placed in the 2D plane and connected if their pairwise distance is less than a unit length—can be encoded without overhead (e.g., such that the number of required atoms only amounts to the number of classical variables in the original MIS problem). Generically, however, graphs of interest for real-world applications will not be unit disk graphs, leaving the mapping between the nodes of the target graph and atomic positions undefined. However, in various embodiments, random key algorithms may be applied to efficiently identify a physical graph $G_p$, similar to the target (problem) graph G, may be performed. If desired, the physical graph $G_p$ can be restricted to the class of unit-disk graphs, allowing for an efficient (overhead-free) embedding of the input graph G. The graph similarity may be improved through a series of techniques, for example using ancilla atoms, as discussed in more detail below.

FIG. 1 illustrates a logical block diagram illustrating graph-based positional assignments for solving optimization problems on quantum computing devices, according to some embodiments. First, the optimization problem 110 (e.g., Hamiltonian H or cost function) may be identified that encodes the optimization problem 110 in terms of decision variables (e.g., variables A through G). For example, the optimization problem 110 may be a mixed-integer optimization problem, with at least one integer variable and at least one non-integer variable (e.g., a continuous variable). In some embodiments, as discussed below, the optimization problem may be a maximum independent set (MIS) problem. However, other types of optimization problems, such as Quadratic Unconstrained Binary Optimization (QUBO) (or equivalently, Ising) may be given. The decision variables may be encoded logically into a graph problem representation 120 with vertices (also referred to as nodes) representing the decision variables and edges, representing the relationships between the decision variables.

In various embodiments, graph-based encoding techniques for determining a physical layout for quantum hardware that solves optimization problems can be implemented to provide an optimal mapping for determining atomic computational positions in Rydberg atom arrays implemented as part of a quantum computing device (or may be applicable to other quantum hardware). For example, classical computing device(s) 130 (e.g., implementing traditional processor hardware, memory, and other computing components as discussed in detail below with regard to FIG. 7, may implement random key physical graph encoding 140. Using random-key algorithms for encoding 140, for a generic input graph G, various embodiments provide a physical graph $G_p$ (similar to G, yet easy to implement with Rydberg atom arrays or other quantum hardware with atomic computational positions) for making position assignments 140 to atomic computational positions 154, given their native connectivity constraints, using a fitness function (e.g., graph similarity or cost function as discussed below). Then, quantum computing device 150 may solve, using quantum algorithm 152, the optimization problem using physical graph position assignments 140 at atomic computational positions 154 to produce a graph solution 160. Graph solution 160 can then be decoded 170 using the same fitness function used to encode into the physical graph (e.g., graph similarity, as discussed below with regard to FIG. 2A or other fitness functions, such as cost functions as discussed below with regard to FIG. 3), to provide the graph problem solution 180, which can indicate or otherwise provide the decision variables of the optimization problem solution 190. Thus, in some embodiments, graph decoding may involve using a mapping, dictionary, or other lookup data structure to decode from physical graph to logical graph that was generated based on the fitness function.

As discussed in detail below with regard to FIGS. 2A-2C, exemplary embodiments may be shown with respect to applications for portfolio management, outlining end-to-end, quantum native pipelines for financial use cases, such as risk diversification or hedging. However, other applications can be found, for example, in wireless network design, packing problems, or map labelling across various industry sectors. Note that these example problems are just some of the many possible optimization problems that can be improved or solved using graph-based encoding techniques for determining a physical layout for quantum hardware, and thus the previous examples are not intended to be limiting. For example, random-key algorithms of various types may be implemented. Similarly, while Rydberg atom arrays are one exemplary embodiment of quantum hardware, various other types of quantum hardware may achieve improved performance through physical layouts determined from graph-based encoding.

Figure 2A:
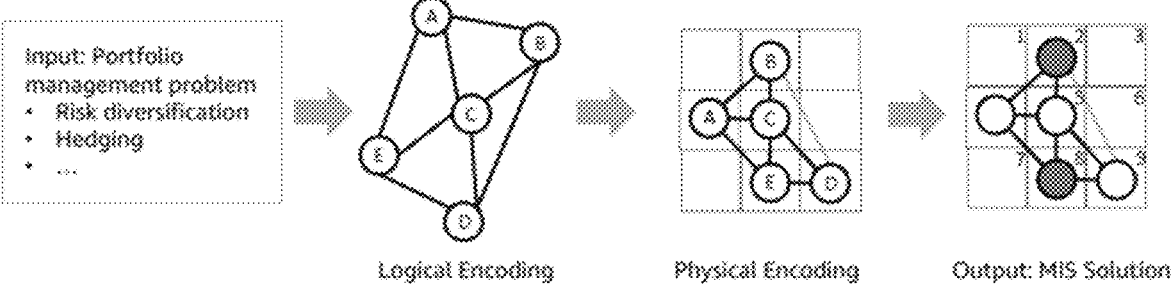
FIG. 2A illustrates an example portfolio optimization pipeline using graph-based positional assignments for solving optimization problems on quantum computing devices, according to some embodiments.
Figure 2B:
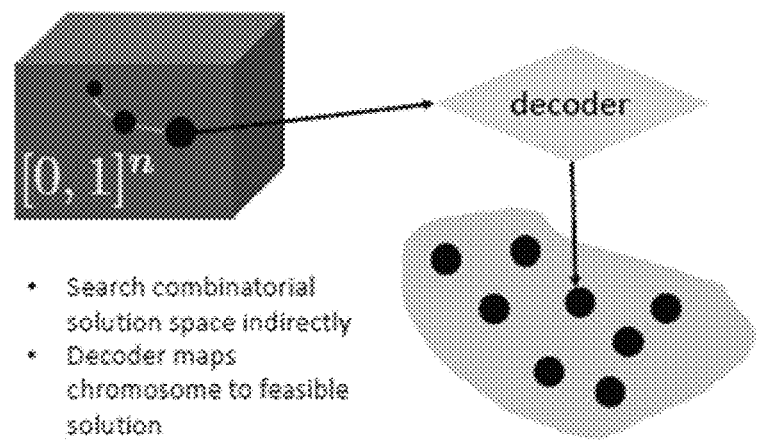
FIG. 2B illustrates an example random key optimization technique, according to some embodiments.
Figure 2C:
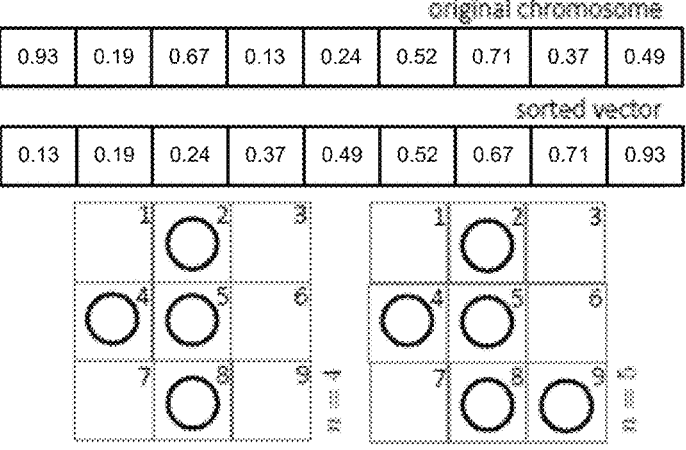
FIG. 2C illustrates an example decoder for graph solutions generated by a quantum computing device, according to some embodiments.

FIG. 2A provides one such example. FIG. 2A illustrates an example portfolio optimization pipeline using graph-based positional assignments for solving optimization problems on quantum computing devices, according to some embodiments. For example, unit-disk graphs may be defined by vertices on a two-dimensional plane with edges connecting all pairs of vertices within a unit distance of one another. By virtue of the Rydberg blockade mechanism, Rydberg atom arrays allow for native (hardware-efficient) encoding of the MIS problem on unit-disk graphs, with the (tunable) disk radius $R_b$ setting the relevant physical length-scale. Since the logical, application-specific graph G is generically not a unit-disk graph, however, in various embodiments, an efficient, heuristic encoding routine optimizing for the atom placement that gives a similar physical graph $G_p$ with unit-disk connectivity (with Rydberg atoms corresponding to the nodes of the graph) may be performed, a graph-based technique, as mentioned above and discussed in detail below.

In various embodiments, such techniques may be based on random-key techniques. For example, the problem input may be given in terms of a graph $G=G(V, E)$, with vertex set $V=\{1, \ldots, n\}$ and edge set $E=\{(i, j): i, j \in V\}$. To solve the problem represented by the problem input, the goal may be to identify a physical, unit-disk graph $G_p=G_p(V_p, E_p)$, similar to G. For simplicity, one can take $|V|=|V_p|=n$, but generalizations are straightforward. As discussed in detail below with regard to FIG. 2C, the decoder is used to implement such a random-key approach. While the problem encoding may specified by the evolutionary part underlying the biased random-key genetic algorithm (BRKGA), in this example of a random key algorithm, as illustrated in FIG. 2B, decoding may be controlled through the design of the decoder. Here, an example decoder is designed as follows using the following pseudo code:

```
def decode (chromosome, graph)
    """
    Example implementation of decoder
    INPUT: chromosome and target graph
    OUTPUT: fitness of chromosome
    """
    #Get size of target graph
    n=len (graph.nodes)
    #Sort random keys
    permutation=argsort (chromosome)
    #Get positions
    positions=permutation [:n]
    #get physical graph
    g_phy=getgraph (positions)
    #get fitness by graph similarity
    fitness=get_similarity (graph, g_phy)
    return fitness
```

In the above example, the simple helper function getgraph( ) constructs a graph for given atomic positions, by adding edges according to the unit disk criterion.

In some embodiments, BRKGA may represent a (nature-inspired, because genetic) heuristic framework for solving optimization problems. The BRKGA formalism is based on the idea that a solution to an optimization problem can be encoded as a vector of random keys, e.g., a vector X in which each entry is a real number, generated at random in the interval (0, 1]. Such a vector X is mapped to a feasible solution of the optimization problem with the help of a decoder, e.g., a deterministic algorithm that takes as input a vector of random keys and returns a feasible solution to the optimization problem, as well as the cost of the solution.

In some embodiments, a (physical) square lattice with lattice spacing a, may be implemented, but these techniques may be used in various other embodiments with spacings that provide other settings (e.g., including continuous atomic positions). In some embodiments, the decoder may take a vector X of N random keys as input (where N is the number of available atomic positions in the lattice), and sorts the keys in increasing order. In some embodiments, the indices of this sorting may make up the solution, where n atoms are placed according to the first n indices associated with the sorted vector. This design may ensure placement of at most one atom per available site, as desired. The fitness (inverse of cost) associated with such a placement can be calculated via graph similarity measures, such as the standard graph edit distance (quantifying the distance between the target graph G, and the decoded physical graph $G_p$), which are then fed back to the optimizer as a feedback signal to be optimized over. Indeed, many graph matching algorithms can be used to assess graph similarity, such as those routinely used in image recognition applications (e.g., based on graph isomorphism), feature extraction, iterative, or deep learning methods. Upon algorithm completion, after a series of evolutionary training steps, BRKGA outputs a graph $G_p$ of high fitness. Graph similarity may be taken as a fitness measure, but generalizations to other metrics may be used for fitness.

A metric of interest may be improved through a series of techniques. For example, the metric of interest may be improved using ancilla atoms, as discussed in detail below with regard to FIG. 3, or coherent transport of atoms to effectively mediate long-range interactions. In the presence of ancilla atoms, site-resolved projective measurements can be used to read out the final quantum many-body state involving both system and ancilla atoms. Finally, simple post-processing will then provide the independent set solution corresponding to system variables only, in some embodiments.

In some embodiments, optimization problems may include various problems of portfolio management. In the discussion that follows, these may provide example applications of the techniques discussed above. For example, the problem of optimally selecting a set of assets from a larger pool of assets is pervasive across many industry verticals. In the financial services industry (FSI), portfolio management may refer to the problem of selecting and overseeing a group of investments that meet the long-term financial objectives and risk tolerance of a client, a company, or an institution. As opposed to passive management, active portfolio management requires strategically buying and selling stocks and other assets, with the ultimate goal of maximizing the investments' expected return within an appropriate level of risk exposure.

The techniques described above may be implemented in various embodiments to address the problem of (active) asset selection for various types of portfolio strategies. For example, a larger portfolio management pipeline that utilizes special-purpose quantum hardware in the form of programmable Rydberg atom arrays may be described, as illustrated in FIG. 2A, to help identify sets of correlated and uncorrelated assets from a larger universe of assets. Such a solution may fit into a comprehensive encode-process-decode framework in which (i) a given portfolio management problem is mapped onto a graph optimization problem (logical encoding) followed by a hardware-aware mapping to Rydberg atom arrays (physical encoding), before (ii) solving the corresponding graph optimization problem using quantum algorithms on specialized Rydberg quantum hardware (processing) and finally (iii) decoding the solution to an actual solution of the original portfolio management problem (decoding). The proposed approach for correlation clustering will allow portfolio managers to pick certain assets from a larger universe in order to implement various diversification and hedging strategies.

Various embodiments of the above techniques may be implemented for risk diversification as an MIS problem. Graphs offer a convenient framework to model many portfolio management problems in finance. Specifically, a risk diversification strategy may be framed as a graph optimization problem, but similar considerations may apply for the implementation of hedging strategies. Such embodiments may consider a (potentially very large) universe of n assets, for which a vector $\mu \in \mathbb{R}^n$ may be given describing expected future returns, and the covariance matrix $\Sigma \in \mathbb{R}^{n \times n}$ capturing volatility through the covariance among assets. To minimize the volatility of returns of a portfolio, a goal may be to select a subset of uncorrelated assets with the largest possible diversified portfolio. To this end, we consider a graph G may be considered with n nodes, with every node representing one asset. Correlations can be described in graph form, either by directly taking the cross-correlation matrix as a weighted adjacency matrix, or by creating a binary adjacency matrix A through thresholding. In this example, the latter is used. $A_{i,j}=1$ may be set if and only if the absolute value of the correlation between assets i and j is greater than some user-specified threshold parameter $\lambda$, and $A_{i,j}=0$ otherwise. Accordingly, in this model, pairs of assets are classified as correlated or uncorrelated based on whether or not the corresponding correlation coefficient exceeds a minimum (threshold) level. To mathematically formulate a risk diversification strategy, for a given graph G=(V, E), a binary variable may be introduced $x_i \in \{0,1\}$ for every vertex $i \in V$, with $x_i=1$ if asset i=1, . . . , n is added to the investment basket, and $x_i=0$ otherwise. Overall, the risk diversification strategy outlined above can then be cast as an optimization problem in Quadratic Unconstrained Binary Optimization (QUBO) (or equivalently, Ising) form. Specifically, one may construct a Hamiltonian that counts the number of marked (colored) vertices and adds a penalty to non-independent configurations (e.g., when two vertices in the set are connected by an edge). This Hamiltonian may be given as:

$$H_{wMIS} = -\sum_{i \in V} \mu_i x_i + P \sum_{(i,j) \in \mathcal{E}} x_i x_j$$

in a straightforward extension of the standard MIS problem to the weighted MIS problem. The first term includes a negative pre-factor (because it is solved for the largest independent set within a minimization problem), while the penalty parameter P>0 enforces the independence constraint. Energetically, the Hamiltonian $H_{wMIS}$ favors each variable being in the state $x_i=1$, unless a pair of variables are connected by an edge. Accordingly, by minimizing the first term of $H_{wMIS}$ large-return assets may be picked, subject to the independent set constraint captured by the second term. In some embodiments, this example technique for the risk diversification problem could be part of a larger, two-stage portfolio management pipeline, where first a subset of assets is selected from a larger universe of assets using our solver, and then capital is allocated within a smaller, sparsified basket of assets using off-the-shelf solvers.

In the discussion above, it has been shown how the MIS problem can be used to identify the largest subset of uncorrelated assets within a larger universe of assets, with the goal of creating a risk diversified portfolio. Along the same lines, given a set of assets, one can identify the largest subset of correlated assets by mapping to the maximum clique problem (MCP). Thus, portfolio managers can make concentrated bets in one direction (e.g., by taking positions in only positively correlated assets) or for hedging (by taking positions in negatively correlated assets). In some embodiments, the implementation of these portfolio strategies is straightforward, given the strict equivalence of the MCP with the MIS problem. Specifically, the maximum clique of a graph G is known to be equal to the maximum independent set of the graph's complement, denoted as $\bar{G}$. Therefore, whenever the implementation of a certain portfolio strategy requires the solution to the MCP on a given graph G, in some embodiments the technique can revert to solving the MIS on the complement $\bar{G}$, using the special purpose, Rydberg-based MIS solver described in more detail below.

In some embodiments, the techniques to solve the weighted MIS problem derived above using quantum devices based on coherent, programmable neutral atoms trapped in (e.g., one, two, or three-dimensional) arrays with the help of optical tweezers. Here, each atom represents a vertex (node), and coherent excitation from an atom's ground state $|0\rangle$ into an excited Rydberg state $|1\rangle$ can be utilized for hardware-efficient encoding of unit-disk MIS problems, with the (tunable) disk radius $R_b$ set by the Rydberg blockade mechanism. Specifically, for a given arrangement of atoms, edges exist according to the unit disk criterion for a unit distance given by the Rydberg blockade radius $R_b$—the distance within which excitation of more than one atom to the Rydberg state is energetically prohibited due to strong van-der-Waals interactions. The Rydberg blockade mechanism thus effectively restricts the evolution primarily to the subspace spanned by the states that obey the independent set constraint of the (physical) graph realized by the Rydberg atoms. Quantum algorithms for optimization can then be implemented via global atomic excitation using homogeneous laser pulses with a time-varying Rabi frequency (and a time-varying phase) $\Omega(t)e^{i\phi(t)}$ and detuning $\Delta(t)$, in the presence of strong Rydberg interactions; generalizations to local, individual atomic excitations are in principle straightforward. The resulting quantum dynamics is described by the Hamiltonian $H=H_{drive}+H_{cost}$, with the quantum driver $H_{drive}$ and the cost function $H_{cost}$ given by (h=1)

$$H_{drive} = \sum_i \left( \Omega(t)e^{i\phi(t)}\hat{\sigma}_i^- + h.c. \right)$$

$$H_{cost} = -\Delta(t)\sum_i \hat{n}_i + \sum_{i<j} V_{ij}\hat{n}_i\hat{n}_j$$

with lowering operator $\hat{\sigma}_i^- = |0\rangle_i\langle 1|$, occupation number operator $\hat{n}_i = |0\rangle_i\langle 1|$, and the interaction potential $V_{ij}=V_0(|r_i-r_j|)^{-6}$ in terms of atomic positions $\{r_i\}$ for atoms $i=1, \ldots, n$. For a positive laser detuning, the many body ground state of the cost function Hamiltonian $H_{cost}$ maximizes the total number of qubits in the Rydberg state under the blockade constraint, corresponding to the MIS of the underlying (physical) unit-disk graph; solutions to the weighted MIS can be generated with local (site-dependent) detunings $\{\Delta_i\}$.

With the relevant cost function encoded in the quantum Hamiltonian $H_{cost}$, low-energy states corresponding to high-quality solutions to the original optimization problem can be sought by starting from a generic initial state $|\Psi_{initial}\rangle$ with a variety of techniques. For example, one can use an adiabatic evolution, or a variational protocol via closed optimization loops. The common theme to any of these approaches is that the system undergoes coherent quantum many-body dynamics, as described by the unitary $U(\Omega(t), \phi(t), \Delta(t), V_{ij})$, in the presence of a programmable laser drive and long-range Rydberg interactions, with the ability to design protocols (or schedules) for the parameters $\Omega(t), \phi(t)$, and $\Delta(t)$. Formally, this may be written $$|\Psi_{final}\rangle = U(\Omega(t),\phi(t),\Delta(t),V_{ij}|\Psi_{initial}\rangle$$

To maximize the overlap with the ground state of $H_{cost}$ at the end of the schedule, a large variety of classical optimization schemes can be used. At the end of the schedule, site-resolved projective measurements can be used to read out the final quantum many-body state, with atoms excited to the Rydberg state corresponding to vertices forming an independent set.

As discussed above, various embodiments of graph-based positional assignments for solving optimization problems on quantum computing devices may be implemented as a pre-processing routine that, for a given problem graph G, generates a physical, unit-disk graph $G_p$ as specified by atomic positions, using random-key algorithms. Once this pre-processing routine has completed, quantum algorithms may be used, as described by the unitary $U(\Omega(t), \phi(t), \Delta(t), V_{ij})$, in the presence of a programmable laser drive and long-range Rydberg interactions, to approximately solve the MIS problem on the physical graph $G_p$. Upon read-out measurements, a bitstring x may be obtained that encodes the MIS solution to the original problem graph G.

Building upon this scheme, a generalized technique that may be implemented in various embodiments, with end-to-end embedding strategy may be described, in which the random-key algorithm may be trained directly against some target objective function (as opposed to intermediary measures such as graph similarity), using the output of the quantum computer directly. FIG. 3 illustrates an example of such techniques, including the use of ancilla nodes. In various embodiments, some of the features of this technique can be described as follows: (i) The target objective does not have to be an MIS problem, and can be generalized to alternative combinatorial optimization problems, including, for example, quadratic unconstrained binary optimization (QUBO) problems, among others. This fitness signal will be used to learn the best possible (unit-disk) atom arrangement under native Rydberg quantum dynamics. (ii) The overhead may be controlled by choosing how many ancilla nodes (e.g., qubits) may or may not be used, providing a heuristic yet hardware-efficient encoding. In some embodiments, a random key random key optimization algorithm will heuristically provide the best possible cost value for the desired number of nodes used. (iii) Since all experimental imperfections (such as noise or interaction tails of the Rydberg interactions) may be directly baked into the cost feedback signal, this technique aims to optimize performance, while also accounting for all real-world imperfections. (iv) Random key optimization may not only learn and optimize the atomic positions with controllable overhead, but may also learn various quantum computing device parameters for executing a quantum algorithm, such as the optimal pulse and detuning patterns within one unified algorithm, in some embodiments.

First, the optimization problem is defined in terms of an undirected graph $G(V, E)$, and a binary variable $x_i$ may be associated with every node $i \in V$. Generically, this input graph may not be a unit-disk graph and thus may not be directly compatible with the Rydberg atom hardware. Similarly, it may be desirable to solve a problem (such as, for example, a QUBO problem defined in terms of the cost function $H=x^TQx$) that is not a MIS problem. In some embodiments, an appropriate decoder may be used to learn one of (or both) optimization of assignments to atomic computation positions for a hardware efficient embedding based on the applied random key technique (e.g., how to sort or order the decision variables in the vector used to produce physical graph as illustrated in FIG. 2C) and optimized quantum computing parameter (e.g., schedules $\Delta(t)$ and $\Omega(t)$ defining the unitary ansatz $U(\Omega(t), \phi(t), \Delta(t), V_{ij})$; generalizations to site resolved schedules $\{\Delta i(t), \Omega i(t)\}$ are straightforward. Since the final feedback signal $H(x)$ (based on which random key optimization determines its optimization trajectory) accounts for experimental imperfections, random key optimization may be trained to provide the best possible solution $x$ in the presence of these errors. Still, potential error mitigation strategies can be made part of the general ansatz $U(\Omega(t), \phi(t), \Delta(t), V_{ij})$.

To illustrate this approach, consider a physical lattice with $N=12$ positions, and a vector of random keys of the form:

$$X=(0.98,0.12,0.07,0.19,0.42,0.52,0.34,0.71,0.67,0.47,$$
$$0.23,0.82, \ldots )$$

Elements in the second block of X denoted with . . . refer to optimization of the schedule (which we will leave unspecified here). Sorting the first twelve elements in ascending order gives:

$$s(X)=(0.07,0.12,0.19,0.23,0.34,0.42,0.52,0.47,0.67,$$
$$0.71,0.82,0.98, \ldots )$$

The corresponding vector of indices is given by [3, 2, 4, 11, 7, 5, 10, 6, 9, 8, 12, 1]. For an example user-defined optimization request for n=5 physical atoms and m=2 ancilla atoms, atom placements may be obtained at positions [3, 2, 4, 11, 7] and ancilla atoms at positions [5, 10], while lattice sites [6, 9, 8, 12, 1] are left unoccupied. Again, this is just one example decoder design and, given the design flexibility of the random-key decoder, many more design choices could be made, all within the same techniques discussed above. Similarly, within the second block of the vector X, the schedules for $\Delta(t)$ and $\Omega(t)$ can be parameterized with both continuous or discrete values, and random key optimization can be used to find optimized values for these.

An example of these techniques is described in detail with regard to FIG. 3. As indicated at 310, the problem input may be specified in terms of a logical input graph G with associated adjacency matrix A, and a cost function as described by, e.g., the QUBO Hamiltonian $H=xTQx$. Within the QUBO framework, the cost function is fully captured by the QUBO matrix Q. As indicated 320, a random-key algorithm provides hardware-efficient mappings to a physical graph $G_p$ with unit-disk connectivity, in which Rydberg atoms correspond to the nodes of the graph. One can search for embeddings with and/or without ancilla nodes, with a controllable overhead set via a request (e.g., as discussed below with regard to FIG. 5). Missing edges, present in G (but not in $G_p$ without the use of ancilla nodes), are dashed. As indicated at 330, quantum algorithms, as may be described by the unitary $U(\Omega(t), \phi(t), \Delta(t), V_{ij})$, in the presence of a programmable laser drive and long-range Rydberg interactions, to approximately solve the MIS problem on the physical graph G. Site-resolved projective measurements read out the final quantum many-body state, with atoms excited to the Rydberg state corresponding to vertices forming an independent set. In some embodiments, ancilla nodes are discarded, and the final output is given in terms of a candidate bitstring x. As indicated at 340, this bitstring is used as input to the cost function H(x) providing a cost signal to the random-key optimizer. Note that (i) the cost function H(x) may be applicable to other optimization problems in addition to the MIS problem, and (ii) random key technique optimization can be used to not only learn and optimize the assigned atomic computation positions with and without ancilla nodes, but to also learn the optimal quantum computing parameters, such as pulse and detuning patterns, referred to as schedules $\Delta(t)$, $\Omega(t)$.

This specification continues with a general description of a provider network that implements multiple different services, including a quantum computing service, which may perform graph-based positional assignments for solving optimization problems on quantum computing devices. Then various examples of the optimization service, including different components/modules, or arrangements of components/module that may be employed as part of implementing the optimization service are discussed. A number of different methods and techniques to implement graph-based positional assignments for solving optimization problems on quantum computing devices are then discussed, some of which are illustrated in accompanying flowcharts. Finally, a description of an example computing system upon which the various components, modules, systems, devices, and/or nodes may be implemented is provided. Various examples are provided throughout the specification.

Figure 4:
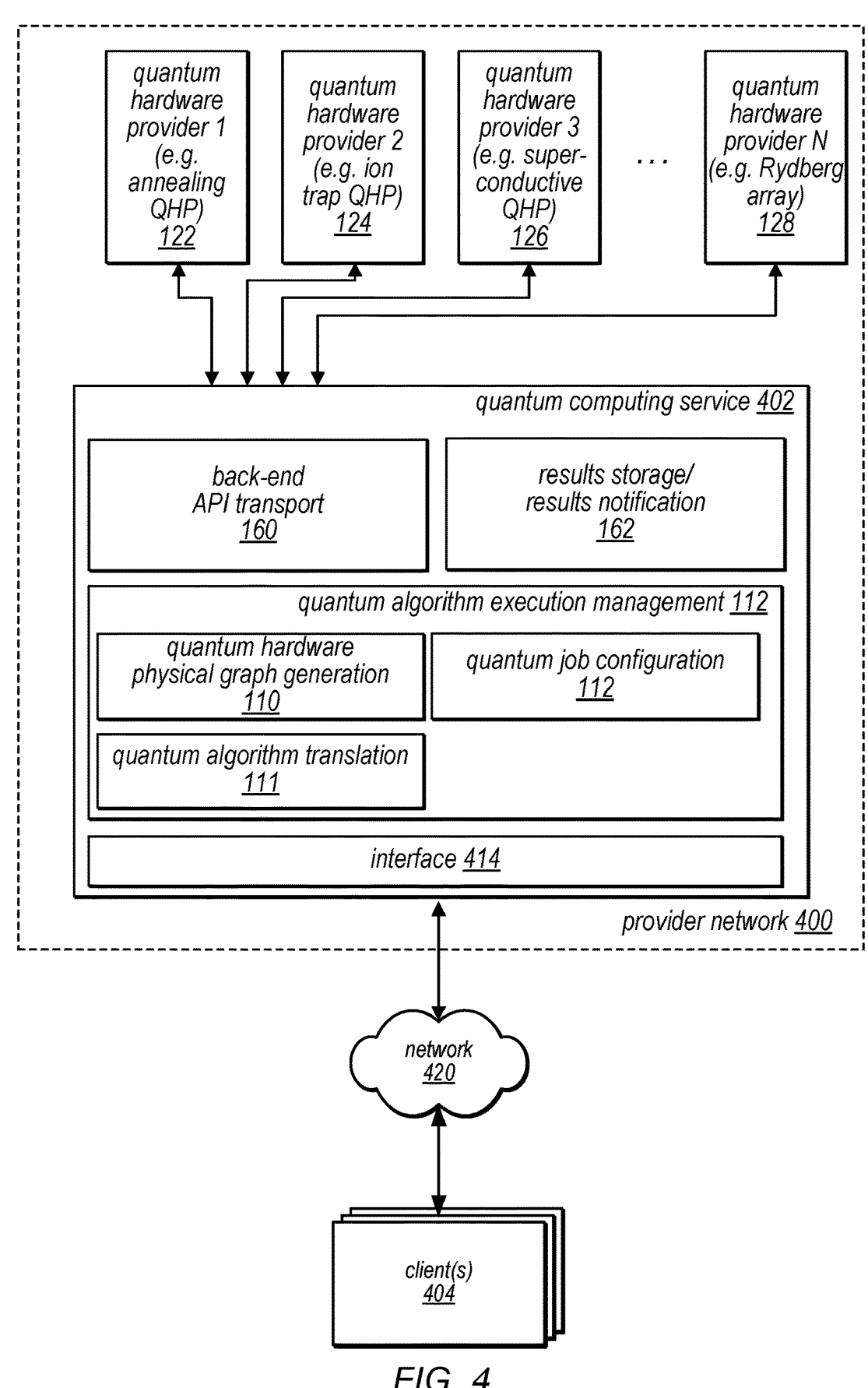
FIG. 4 illustrates a logical block diagram illustrating a quantum computing service offered by a provider network, according to some embodiments.

FIG. 4 illustrates a logical block diagram illustrating a quantum computing service offered by a provider network, according to some embodiments. Provider network 400 may be a private or closed system or may be set up by an entity such as a company or a public sector organization to provide one or more services (such as various types of cloud-based storage) accessible via the Internet and/or other networks to clients 404, in one embodiment. Provider network 400 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 400 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 400 may implement various computing resources or services, such as quantum computing service 402, and/or any other type of network-based services (which may include a virtual compute service and various other types of storage, database or data processing, analysis, communication, event handling, visualization, data cataloging, data ingestion (e.g., ETL), and security services), in some embodiments.

The provider network 400 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Clients can connect to availability zones of the provider network 400 via a publicly accessible network (e.g., the Internet, a cellular communication network). Regions are connected to a global network which includes private networking infrastructure (e.g., fiber connections controlled by the cloud provider) connecting each region to at least one other region. The provider network 400 may deliver content from points of presence outside of, but networked with, these regions by way of edge locations and regional edge cache servers. This compartmentalization and geographic distribution of computing hardware enables the provider network 400 to provide low-latency resource access to customers on a global scale with a high degree of fault tolerance and stability.

In FIG. 4, provider network 400 (e.g., similar to provider network 100) may include quantum computing service 402 (e.g., similar to quantum computing service 102), which may provide a plurality of clients 404 access to various quantum computing resources offered by quantum hardware providers (QHPs) 522, 524, 526, and. As indicated in FIG. 4, QHPs 422-428 may provide quantum computers implemented using different quantum computing technologies (e.g., annealing-based quantum computing, ion trap quantum computing, super-conductive quantum computing, and Rydberg array based computing computing). Note that these are merely provided as examples. In some embodiments, these providers 422-428 may be implemented all (or in part) outside of provider network 400. In some embodiments, quantum computing service 402 may include user interface 414 through which users 404-408 may interact with quantum computing service 402 via network 420. In some embodiments, interface 414 may include a CLI, a graphic interface, a menu-driven interface, etc.

In some embodiments, quantum computing service 402 may include quantum algorithm execution management 412. As described above, when quantum computing service 402 receives a quantum task from a user (e.g., client 404) for executing a quantum algorithm, quantum algorithm execution management 412 may translate 411 the quantum algorithm to generate one or more compiled versions of the quantum algorithm, including qubit gates native to respective ones of the quantum computers of QHPs 422-428. In some embodiments, the compiled versions of the quantum algorithm may indicate one or more characteristics of the quantum algorithm with respect to execution of the algorithm on quantum computers. As discussed in detail above with regard to FIGS. 1-3, and below with regard to FIGS. 5 and 6, quantum algorithm execution management 412 may implement quantum hardware physical graph generation 410 for optimization performance of quantum algorithms for solving optimization problems, and thus the assignments of nodes representing decision variables to atomic computation positions may be included as part quantum job configuration 412, which may configure and otherwise provide the information (via back-end API transport 460) needed to perform a quantum task (e.g., generate a graph solution for an optimization problem).

In some embodiments, quantum computing service 402 may include a quantum computer recommendation system (not illustrated). In some embodiments, quantum computer recommendation system may evaluate the quantum algorithm, e.g., based on a combination of the algorithm's characteristics and respective metrics of the quantum computers, to select at least one quantum computer for executing the quantum algorithm.

In some embodiments, quantum computing service 402 may include back-end API transport module 460. Algorithms that have been translated by quantum algorithm execution management 412 may be provided to back-end API transport module 460 in order for them to be transported to the quantum computers at a respective QHP location for execution. In some embodiments, back-end API transport module 460 may implement one or more queues to queue the algorithm for execution on the quantum computers of QHPs 422-428.

In some embodiments, results of executing the algorithm on the quantum computers may be stored in a data storage system of provider network 400. In some embodiments, results storage/results notification 462 may coordinate storing results and may notify a user (e.g., client 404) that the results are ready from the execution of the user's algorithm. In some embodiments, results storage/results notification 462 may cause storage space in a data storage service to be allocated to client 404 to store the user's results. Also, results storage/results notification 462 may specify access restrictions for viewing the user's results in accordance with the user's preferences.

In some embodiments, quantum compute simulator using classical hardware may be implemented as part of quantum computing service 402 may be used to simulate a quantum algorithm using classical hardware. For example, one or more virtual machines of a virtual computing service may be instantiated to process an algorithm simulation job. In some embodiments, the simulation may involve multiple classical computing resources (e.g., classical computers, ASICs, GPUs, etc.), where some may be used to simulate quantum computing and the others may be used as a co-processor to process the classical computing. In some embodiments, quantum compute simulator using classical hardware may fully manage compute instances that perform the simulation. For example, in some embodiments, client 404 may submit an algorithm to be simulated, and quantum compute simulator using classical hardware may determine resources needed to perform the simulation job, reserve the resources, configure the resources, etc. In some embodiments, quantum compute simulator using classical hardware may include one or more "warm" simulators that are pre-configured simulators such that they are ready to perform a simulation job without a delay typically involved in reserving resources and configuring the resources to perform simulation.

In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of quantum computing service 402 may be implemented by a particular node or may be distributed across several nodes. In some embodiments, a given node may implement the functionality of more than one service system component (e.g., more than one data store component). As discussed below with regard to FIG. 4, quantum computing devices may also be implemented as part of provider network 400 (or made accessible to provider network 400 for use by quantum computing service 402).

Generally speaking, clients 404 may encompass any type of client that can submit network-based requests to provider network 400 via network 420, including requests for quantum computing service 402 (e.g., a request to solve an optimization problem, etc.). For example, a given client 404 may include a suitable version of a web browser, or may include a plug-in module or other type of code module that can execute as an extension to or within an execution environment provided by a web browser. Alternatively, a client 404 may encompass an application such as an application that may make use of quantum computing service 402 to implement various applications. For example, a client 404 may perform optimization as part of an application that can utilize the classifications of decision variables for a problem, as discussed below. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 404 may be an application that can interact directly with provider network 400. In some embodiments, client 404 may generate network-based services requests according to a Representational State Transfer (REST)-style network-based services architecture, a document or message-based network-based services architecture, or another suitable network-based services architecture.

In some embodiments, a client 404 may provide access to provider network 400 to other applications in a manner that is transparent to those applications. Clients 404 may convey network-based services requests (e.g., optimization solution requests) via network 420, in some embodiments. In various embodiments, network 420 may encompass any suitable combination of networking hardware and protocols necessary to establish network-based-based communications between clients 404 and provider network 400. For example, network 420 may generally encompass the various telecommunications networks and service providers that collectively implement the Internet. Network 420 may also include private networks such as local area networks (LANs) or wide area networks (WANs) as well as public or private wireless networks, in one embodiment. For example, both a given client 404 and provider network 400 may be respectively provisioned within enterprises having their own internal networks. In such an embodiment, network 420 may include the hardware (e.g., modems, routers, switches, load balancers, proxy servers, etc.) and software (e.g., protocol stacks, accounting software, firewall/security software, etc.) necessary to establish a networking link between given client 404 and the Internet as well as between the Internet and provider network 400. It is noted that in some embodiments, clients 404 may communicate with provider network 400 using a private network rather than the public Internet.

Figure 5:
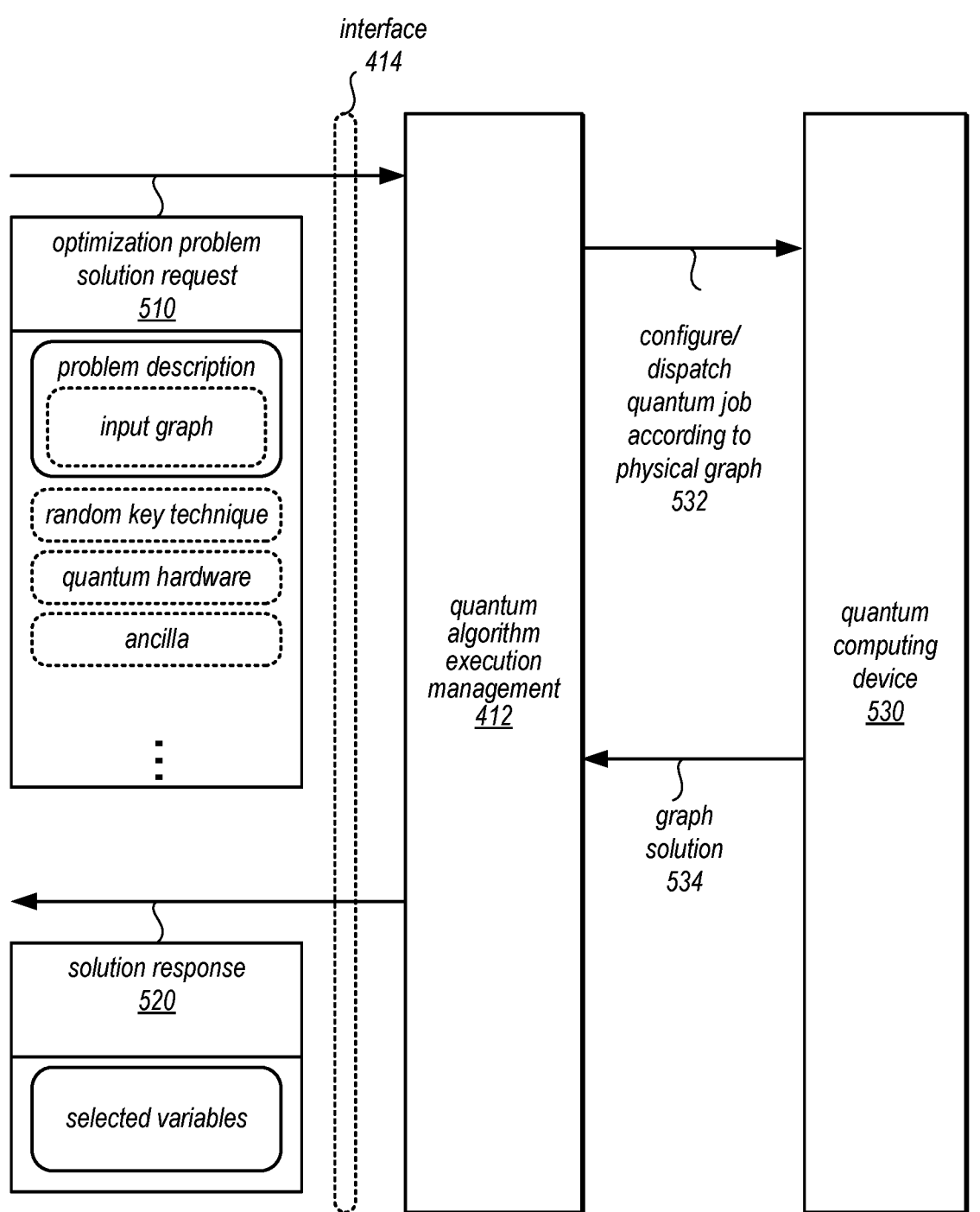
FIG. 5 illustrates a logical block diagram illustrating interactions with a quantum computing service to solve optimization problems, according to some embodiments.

FIG. 5 illustrates a logical block diagram illustrating interactions with a quantum computing service to solve optimization problems, according to some embodiments. An optimization problem solution request 510 may be received at quantum computing service 402 via an interface 302 (e.g., one of the various types of interfaces discussed above). Optimization problem solution request 510 may include various features, such as a problem encoding, like matrix (or tensor) encodings according to a MIS, QUBO (or PUBO) models, or other optimization problems. In some embodiments, a problem description may include an indication of which variables are integer variables and which are non-integer variables (e.g., continuous). Bounds on the variables may also be specified (e.g., range values for the variables). Note that optimization problem solution request 510 may be made for other optimization problems besides mixed-integer problems, such as a continuous variable optimization problem that includes all non-integer decision variables, or integer-only optimization problems. Optimization problem solution request 510 may include the problem already encoded as a graph, as discussed above.

Various other features to configure or affect the execution of optimization problem solution request may be included, in some embodiments. For example, a selection of a specific random key technique out of multiple offered random key techniques may be made. In some embodiments, a selection of a particular type of quantum hardware (e.g., a Rydberg array of particular size or shape). In some embodiments, whether (or not) ancilla nodes can be used to generate a graph solution, as well as number of the ancilla nodes may be specified.

Quantum algorithm execution management 412 may generate a physical graph according to the techniques discussed above and dispatch 532 a quantum job according to the physical graph at a quantum computing device 530. Quantum computing device 530 may execute the quantum job and return a graph solution 534. Quantum algorithm execution management 412 may then decode the graph solution and provide solution response 520, including the selected variables. In some embodiments, the decoded response may be used as part of a machine learning training loop to further train the random key optimization for generating the physical graph based on the output of random key techniques and/or train other features, such as quantum computing parameters. Stop criteria for determining when to stop training and provide the solution may be included as part of request 510.

Although FIGS. 2-5 have been described and illustrated in the context of a provider network implementing an quantum computing service, the various components illustrated and described in FIGS. 2-5 may be easily applied to other systems that utilize quantum computing devices for solving optimization problems. As such, FIGS. 2-5 are not intended to be limiting as to other embodiments of graph-based positional assignments for solving optimization problems on quantum computing devices.

FIG. 6 illustrates a high-level flowchart of various methods and techniques to implement graph-based positional assignments for solving optimization problems on quantum computing devices, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, an input graph that represents an optimization problem may be obtained by a classical computing device, in various embodiments. The input graph may include nodes that represent decision variables of the optimization problem and edges between the nodes. As discussed above, in some embodiments, the input graph may be generated or determined from other descriptions of the optimization problem. In some embodiments, this may be performed by the classical computing device (or at another classical computing device that submits a request to solve the optimization problem).

As indicated at 620, a physical graph of the input graph may be determined by the classical computing device based on a random key technique that is applied to the input graph to generate a vector to map one or more of the nodes and one or more of the edges to the physical graph, in some embodiments. The physical graph may assign the one or more nodes to different atomic computational positions in a quantum computing device. For example, as discussed above with regard to FIG. 2C, the random key technique may produce a vector for decision variables (or encoded decision variables). Then, various strategies for assigning these decision variables in the vector may be performed. In the example illustrated in FIG. 2C, the vector may be sorted and then used to select decision variables to include as nodes in the physical graph (up to some limit which may be determined based on the number of available atomic computational positions of the quantum computing device). The assignment of the decision variables may be trained as part of training a random key optimizer (as discussed above).

As indicated at 630, the classical computing device may provide the optimization problem to the quantum computing device according to the physical graph for execution using the assignments of the one or more nodes to the different atomic computational positions, in some embodiments. For example, the physical graph may be specified as part of a series of controls, instructions, or other parameters used to initiate the performance of a quantum algorithm on the quantum computing device. An interface may be used by the classical computing device to submit these controls, instructions, or other parameters (e.g., an API).

As indicated at 640, the classical computing device may obtain a graph solution to the optimization problem generated by the quantum computing device, according to some embodiments. For example, a bitstring (as discussed above) or other output from the quantum computing device may be obtained (e.g., which may indicate which qubits are excited).

As indicated at 650, the classical computing device may decode the graph solution to the optimization problem, according to a fitness function to determine one or more of the decision variables to provide as a solution to the optimization problem, in some embodiments. For example, as discussed above with regard to FIGS. 1-3, the fitness function may be a graph similarity function or a cost function in some embodiments. The elements of FIG. 6 may be repeated multiple times as part of training the random key technique (as indicated by the dotted line returning from 650 to 620). For example, the fitness function may be a cost function, which can be used to make adjustments to train physical graph assignments based on the random key technique, and/or other features, such as quantum computing parameters.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
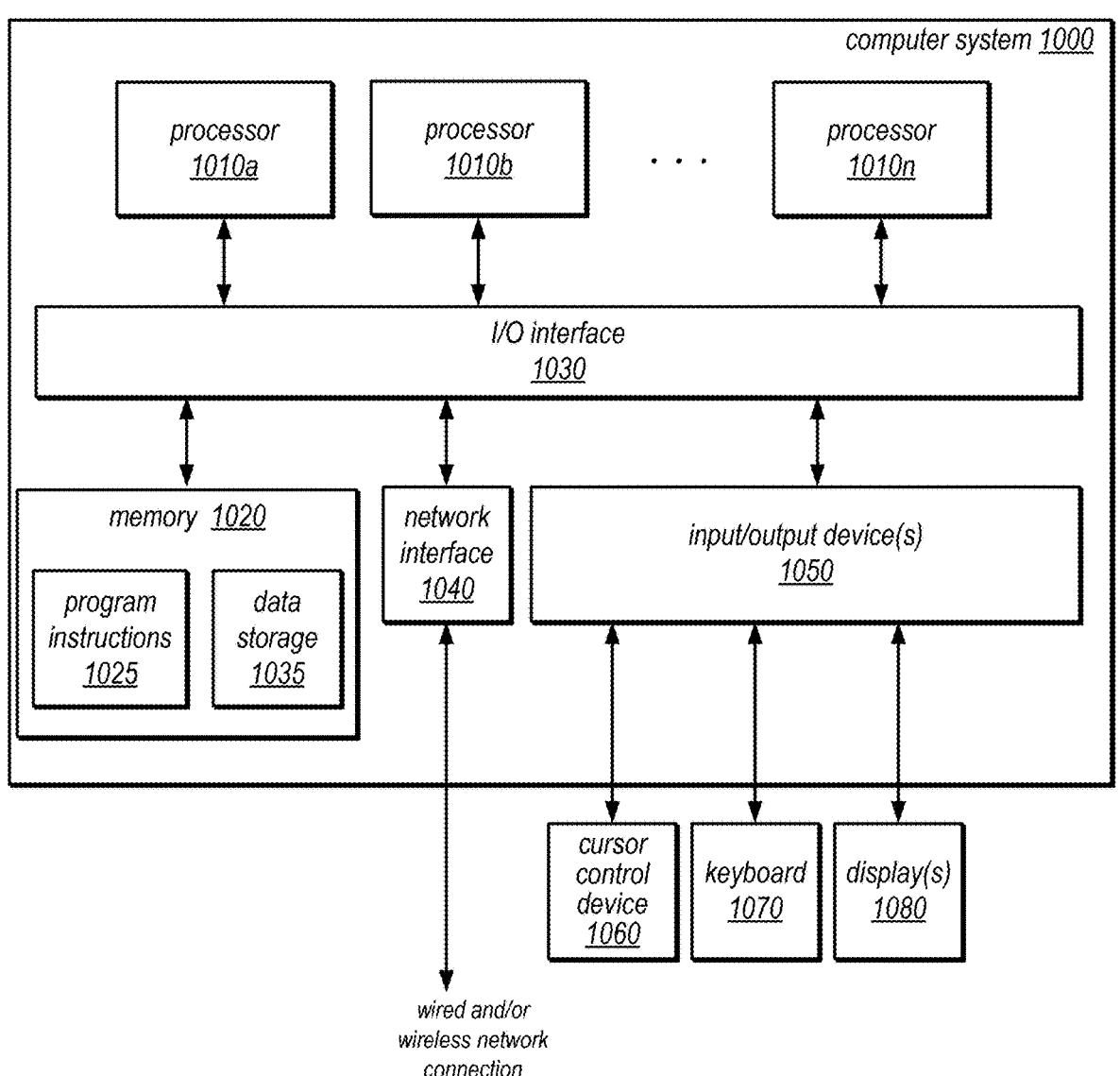
FIG. 7 illustrates an example system to implement the various methods, techniques, and systems described herein, according to some embodiments.

Embodiments of graph-based positional assignments for solving optimization problems on quantum computing devices as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modem GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a classical computing device, respectively comprising a processor and a memory, wherein the memory comprises program instructions that when executed by the processor, cause the classical computing device to:
receive an input graph that represents an optimization problem, wherein the input graph comprises a plurality of nodes that represent decision variables of the optimization problem and a plurality of edges between individual ones of the plurality of nodes;
determine a physical graph of the input graph based on a random key technique that is applied to the input graph to generate a vector to map one or more of the nodes and one or more of the edges to the physical graph, wherein the physical graph assigns the one or more of the nodes to different atomic computational positions in a quantum computing device;
provide the optimization problem to the quantum computing device according to the physical graph for execution;
the quantum computing device comprising a plurality of atomic computational positions, configured to:

generate a graph solution to the optimization problem using the assignments of the one or more nodes to the different atomic computational positions of the plurality of atomic computational positions, wherein the assignments to the different atomic computational positions are less than a total number of the plurality of atomic computational positions;
provide the graph solution to the classical computing device;
wherein the classical computing device is further configured to:
determine one or more of the decision variables to provide as a solution to the optimization problem according to a fitness function applied to the graph solution to decode the graph solution.

2. The system of claim 1, wherein the fitness function is a graph similarity function that compares the graph solution with the input graph to determine the one or more decision variables to provide as the solution.

3. The system of claim 1, wherein the fitness function is a cost function that is evaluated with respect to the graph solution to determine the one or more decision variables to provide as the solution, wherein the solution is one of a plurality of solutions determined as part of repeatedly training generation of the physical graph based on the random key technique using the cost function to determine changes in subsequent versions of the physical graph for solution by the quantum computing device.

4. The system of claim 1, wherein the quantum computing device is a Rydberg array.

5. A method, comprising:
obtaining, by a classical computing device, an input graph that represents an optimization problem, wherein the input graph comprises a plurality of nodes that represent decision variables of the optimization problem and a plurality of edges between individual ones of the plurality of nodes;
determining, by the classical computing device, a physical graph of the input graph based on a random key technique that is applied to the input graph to generate a vector to map one or more of the nodes and one or more of the edges to the physical graph, wherein the physical graph assigns the one or more of the nodes to different atomic computational positions in a quantum computing device;
providing, by the classical computing device, the optimization problem to the quantum computing device according to the physical graph for execution using the assignments of the one or more nodes to the different atomic computational positions;
obtaining, by the classical computing device, a graph solution to the optimization problem generated by the quantum computing device; and
decoding, by the classical computing device, the graph solution to the optimization problem, according to a fitness function to determine one or more of the decision variables to provide as a solution to the optimization problem.

6. The method of claim 5, wherein the determined physical graph includes one or more ancilla nodes to represent one or more missing edges from the one or more nodes, wherein the one or more ancilla nodes are assigned to further atomic computational positions for generating the graph solution by the quantum computing device.

7. The method of claim 6, wherein the number of ancilla nodes assigned is specified in a request to solve the optimization problem.

8. The method of claim 5, wherein the fitness function is a graph similarity function that compares the graph solution with the input graph to determine the one or more decision variables to provide as the solution.

9. The method of claim 8, wherein the optimization problem is a maximum independent set (MIS) problem.

10. The method of claim 5, wherein the fitness function is a cost function that is evaluated with respect to the graph solution to determine the one or more decision variables to provide as the solution, wherein the solution is one of a plurality of solutions determined as part of repeatedly training generation of the physical graph based on the random key technique using the cost function to determine changes in subsequent versions of the physical graph for solution by the quantum computing device.

11. The method of claim 5, wherein the fitness function is a cost function that is evaluated with respect to the graph solution to determine the one or more decision variables to provide as the solution, wherein the solution is one of a plurality of solutions determined as part of repeatedly training one or more quantum computing parameters for generating solutions to the optimization problem.

12. The method of claim 10, wherein the repeated training of the random key technique includes providing different physical graphs with ancilla nodes and without ancilla nodes to the quantum computing device.

13. The method of claim 5, wherein the classical computing device is implemented as part of a quantum computing service offered by a provider network, wherein the input graph is obtained according to a request received at the quantum computing service to solve the optimization problem.

14. One or more non-transitory, computer-readable storage media, storing program instructions that when executed on or across one or more computing devices cause the one or more classical computing devices to implement:

receiving an input graph that represents an optimization problem, wherein the input graph comprises a plurality of nodes that represent decision variables of the optimization problem and a plurality of edges between individual ones of the plurality of nodes;

determining a physical graph of the input graph based on a random key technique that is applied to the input graph to generate a vector to map one or more of the nodes and one or more of the edges to the physical graph, wherein the physical graph assigns the one or more of the nodes to different atomic computational positions in a quantum computing device;

providing the optimization problem to the quantum computing device according to the physical graph for execution using the assignments of the one or more nodes to the different atomic computational positions;

obtaining a graph solution to the optimization problem generated by the quantum computing device; and determining one or more of the decision variables to provide as a solution to the optimization problem according to a fitness function applied to the graph solution to decode the graph solution.

15. The one or more non-transitory, computer-readable storage media of claim 14, wherein the determined physical graph includes one or more ancilla nodes to represent one or more missing edges from the one or more nodes, wherein the one or more ancilla nodes are assigned to further atomic computational positions for generating the graph solution by the quantum computing device.

16. The one or more non-transitory, computer-readable storage media of claim 14, wherein the random key technique is one of a plurality of random key techniques that are selectable in a request to solve the optimization problem.

17. The one or more non-transitory, computer-readable storage media of claim 14, wherein the random key technique is a biased random-key genetic algorithm (BRKGA).

18. The one or more non-transitory, computer-readable storage media of claim 14, wherein the fitness function is a graph similarity function that compares the graph solution with the input graph to determine the one or more decision variables to provide as the solution.

19. The one or more non-transitory, computer-readable storage media of claim 14, wherein the fitness function is a cost function that is evaluated with respect to the graph solution to determine the one or more decision variables to provide as the solution, wherein the solution is one of a plurality of solutions determined as part of repeatedly training generation of the physical graph based on the random key technique using the cost function to determine changes in subsequent versions of the physical graph for solution by the quantum computing device.

20. The one or more non-transitory, computer-readable storage media of claim 14, wherein the one or more classical computing devices are implemented as part of a quantum computing service offered by a provider network, wherein the quantum computing device is selected out of a plurality of different quantum computing devices made available for quantum computing by the quantum computing service.

* * * * *